United States Patent
Moriuchi et al.

(10) Patent No.: US 6,436,557 B1
(45) Date of Patent: Aug. 20, 2002

(54) FLAME RETARDANT RESIN COMPOSITION, AND INSULATING ELECTRIC WIRE, TUBE, HEAT-SHRINKABLE TUBE, FLAT CABLE, AND DC HIGH-TENSION ELECTRIC WIRE ALL MADE OF THE COMPOSITION

(75) Inventors: Kiyoaki Moriuchi; Hiroshi Hayami; Satoshi Shukushima, all of Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/463,517

(22) PCT Filed: May 26, 1999

(86) PCT No.: PCT/JP99/02784

§ 371 (c)(1),
(2), (4) Date: Jan. 27, 2000

(87) PCT Pub. No.: WO99/63004

PCT Pub. Date: Dec. 9, 1999

(30) Foreign Application Priority Data

May 29, 1998 (JP) .......................................... 10-164453
Jul. 29, 1998 (JP) .......................................... 10-227514
Nov. 24, 1998 (JP) .......................................... 10-333174

(51) Int. Cl.[7] .............................................. B32B 19/00
(52) U.S. Cl. ...................... 428/689; 428/378; 428/379; 428/457; 428/688
(58) Field of Search .................... 428/375, 378, 428/380, 389, 394, 401, 379, 359, 457, 688, 689

(56) References Cited

U.S. PATENT DOCUMENTS 5,236,985 A   8/1993   Hayami ...................... 524/265

FOREIGN PATENT DOCUMENTS

JP   5-78586    *  4/1991
JP   3-226911   *  7/1991

* cited by examiner

Primary Examiner—Merrick Dixon
(74) Attorney, Agent, or Firm—Smith, Gambrell & Russell, LLP

(57) ABSTRACT

(1) A flame retardant resin composition comprising 100 parts by weight of thermoplastic resin, 100 to 250 parts by weight of metal hydroxide, and either 5 to 50 parts by weight of acetate or 5 to 80 parts by weight of calcium carbonate. (2) An insulated wire provided with an insulating layer made of the flame retardant resin composition. (3) A thin-wall high-strength insulated wire obtained by having a conductor with an outer diameter 1.0 mm or less covered with the flame retardant resin composition with a thickness from 0.1 mm to 1.0 mm. (4) An insulating tube and a heat-shrinkable tube obtained by molding the flame retardant resin composition into a tubular form. (5) A flat cable obtained by enclosing a plurality of conductors arranged in parallel in an insulating layer and the flat cable obtained by further laminating at least one face of the insulating layer with a film made of polymeric material. (6) A high-voltage DC electric wire provided with an insulating layer made of the flame retardant resin composition. (7) Articles as mentioned above having the flame retardant resin composition cross-linked, especially irradiated with ionizing radiation. Insulated wire, tube, heat-shrinkable tube and flat cable having excellent mechanical strength and flame retardance without generating any harmful gas, when burning, are provided. The insulated wire and the flat cable are suitably used for inner wiring of consumer's electronic devices, automobiles and ships and so on.

18 Claims, 2 Drawing Sheets

FLAME RETARDANT RESIN COMPOSITION, AND INSULATING ELECTRIC WIRE, TUBE, HEAT-SHRINKABLE TUBE, FLAT CABLE, AND DC HIGH-TENSION ELECTRIC WIRE ALL MADE OF THE COMPOSITION

TECHNICAL FIELD

The present invention relates to flame retardant resin compositions that do not produce harmful gases such as hydrogen halide when burned and have excellent mechanical strength and relates to products made by using the same, including insulated wire, tube. heat-shrinkable tube, flat cable, and high voltage DC electric wire.

BACKGROUND

The insulation of insulated wires used in the field of electronic appliances and vehicles, insulators for tubes, heat-shrinkable lubes, and flat cables, and the insulation and sheath of high voltage DC electric wires for television sets, electromagnetic cooking ranges, copying machines, and the like are generally required to have a mechanical strength of 1.0 kg/mm$^2$ or more in terms of tensile strength. For example, referring to the UL Standards widely adopted in the field of electronic appliances, in the case of insulated wires, tubes, heat-shrinkable tubes, and flat cables using such plastics as polyethylene as the insulator, the insulator is required to have a tensile strength of 1.06 kg/mm$^2$ or more.

Further, flame retardance is also required of the insulated wires, tubes, heat-shrinkable tubes, flat cables, and the high voltage DC electric wires used in the above fields. Generally, horizontal flame retardance of the same is required in the field of vehicles and vertical flame retardance in the field of electronic appliances.

As a method for testing the vertical flame retardance, the vertical test (VW-1 test) provided in Subject 758 of the UL Standards as shown, for example, in FIG. 1, is well known. This is a combustion test performed on a specimen 5 of an insulated wire, a tube, a heat-shrinkable tube, a flat cable, or a high voltage DC electric wire vertically held by a fastener 3. In the test, the flame of a burner 2 is applied to the same specimen five times from under the specimen for a duration of 15 seconds each time with 15 seconds intervals between the respective applications thereof In the test, it is required that the insulation cease to flame within 60 seconds, absorbent cotton 4 placed thereunder should not ignite from burning droppings from the specimen, and kraft paper 1 fixed above the specimen should not burn or scorch.

In the case of a tube, an all-tubing flame test is sometimes performed to assess the flame retardance of the specimen, namely, a metallic bar with the same diameter as the inner diameter of the tube is inserted through the tube and the specimen is subjected to the same test as the VW-1 test. Sometimes, a heat-shrinkable tube is also subjected to an all-tubing flame test to assess its flame retardance, namely, the heat-shrinkable tube is put on a metallic bar having the same diameter as the inner diameter of the heat-shrinkable tube when it becomes shrunken and the same test as the VW-1 test is performed on the specimen.

As materials for the above-described insulators of insulated wires, tubes, heat-shrinkable tubes, and insulators of flat cables satisfying the requirements for both mechanical strength and flame retardance, resin compositions comprising polyvinyl chloride such as flexible polyvinyl chloride compositions have long been known. Since such materials are excellent in both mechanical strength and flame retardance and, economical as well, they are widely used as the materials for forming insulated wires and flat cables applicable to the fields of electronic appliances and vehicles.

However, the resin compositions produced by using polyvinyl chloride generate combustion gases harmful to the human body, such as hydrogen chloride, once burned, and also many of the resin compositions are mixed with heavy metal substances such as lead-based compounds for stabilizing their processing. Hence, they have an undesirable aspect against protection of the environment.

In view of these problems, there have been known and put to practical use flame retardant resin compositions obtained by mixing ethylene polymer such as polyethylene with a phosphorus-containing flame retardant agent, or by mixing the same with a flame-retardant agent such as aluminum hydroxide or magnesium hydroxide, i.e., the so-called non-halogen flame retardant resin compositions. However, there have been problems with some of the phosphorus-containing flame-retardant agents in that they exhibit acute toxicity when taken by mouth and, further, they corrode the conductors when mixed in resin compositions used in insulated wires and flat cables.

On the other hand, flame-retardant agents made of metal hydroxide have only a moderate flame-retardant effect on such plastics as ethylene polymer. Therefore, in order to obtain flame retardance equivalent to that of the polyvinyl chloride resin composition, it is required, for example, to have 100 parts or more by weight of metal hydroxide compounded with 100 parts by weight of ethylene polymer such as polyethylene, though this is not always true because it depends on the shape and size of the product. The drawback of compounding such a large quantity of metal hydroxide with the base resin, however, is that it markedly lowers the mechanical strength of the resin composition.

Insulated wires based on the UL Standards to be used for wiring work within electronic appliances are normally prescribed to have a minimum thickness of 0.15 mm at 30 V rating, 0.4 mm at 300 V rating, and 0.8 mm at 600 V rating. Further, it is preferred that the insulated wire to be used for wiring work within electronic appliances have as small an outer diameter of as possible to allow easy handling of the wire, and for the conductor, a diameter of about 1.0 mm or less is used except in special cases (refer to page 13 of "Handbook of Electronic Wire Products", published by Sumitomo Electric Industries, Ltd.).

Halogen-free polyolefin insulated wires having a conductor of 1.0 mm or less in outer diameter and an insulation of 0.1 mm to 1.0 mm thickness which pass the VW-1 test and satisfy the requirements for mechanical strength such as initial tensile strength have been unknown. Recently, however, a thin-wall high-strength non-halogen insulated wire satisfying the UL Standards was developed (Japanese Patent Nos. 2525982 and 2525968).

Although the above-mentioned insulated wire satisfies the requirement to cease to flame within 60 seconds as provided in the Standards for the VW-1 test, it occasionally continues burning over 20 seconds. Therefore, the development of a non-halogen flame retardant insulated wire with greater flame retardance has been desired.

On the other hand, in the case of high voltage DC electric wire, ethylene-α-olefin copolymer such as polyethylene is used to cover the conductor to improve the anti-tracking property of the wire. However, to offset the drawback of inflammability of polyethylene, it has been the practice to cover the high voltage DC electric wire with a flame retardant resin composition having, as the main ingredients, a halogen-containing polymer such as polyvinyl chloride, thereby securing the flame retardance of the high voltage DC electric wire. However, since the resin composition using polyvinyl chloride generates combustion gases harmful to the human body such as hydrogen chloride, once burned, and many of the resin compositions contain heavy metal substances such as a lead-base compound for the purpose of stability in the fabrication, it has an undesirable aspect from the viewpoint of environmental preservation. Therefore, the development of a non-halogen high voltage DC electric wire has been desired.

DISCLOSURE OF INVENTION

Through various investigations on the above enumerated problems, the inventors have learned that a flame retardant resin composition obtained by having 100 parts by weight of thermoplastic resin compounded with 100 to 250 parts by weight of metal hydroxide and either 5 to 50 parts by weight of acetate or 5 to 80 parts by weight of calcium carbonate does not generate harmful gases such as hydrogen halide, e.g., hydrogen chloride when burned, exhibits flame retardance of the same level or higher than that of PVC in the VW-1 test according to the UL Standards. Though the flame retardant resin composition compounded with acetate or calcium carbonate does not show a difference in terms of the limiting oxygen index (LOI) when compared with a flame retardant resin composition not compounded with acetate or calcium carbonate, it exhibits excellent mechanical strength. The inventors have confirmed that this flame retardance resin composition can be used for flame retardant insulated wire, flat cable, and high-voltage DC electric wire.

[I] Flame Retardant Resin Composition (1) Namely, the invention provides a flame retardant resin composition obtained by comprising 100 to 250 parts by weight of metal hydroxide and either 5 to 50 parts by weight of acetate or 5 to 80 parts by weight of calcium carbonate, based upon 100 parts by weight of thermoplastic resin.

(2) The flame retardant resin composition is characterized also in that it comprises the calcium carbonate in the amount from 5 to 30 parts by weight.

(3) The flame retardant resin composition is characterized in that the thermoplastic resin is one kind or a mixture of two or more kinds of ethylene-α-olefin copolymer selected from ethylene-vinyl acetate copolymer, ethylene-ethyl acrylate copolymer, ethylene-methyl methacrylate copolymer, ethylene-methacrylic acid copolymer, and ethylene-methyl acrylate copolymer.

(4) The flame retardant resin composition is characterized in that the ethylene-α-olefin copolymer is an ethylene-vinylacetate copolymer containing 6 to 50 % by weight of vinyl acetate component and has a melt flow rate of 0.5 to 30(at a temperature of 190° C. and under a load of 2.16 kg).

(5) The flame retardant resin composition is characterized in that an organosilicon compound coupling agent expressed as general formula [1]:

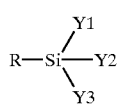

[1]

(where R denotes alkyl including acryl, methacryl, or allyl and Y 1, Y 2, and Y3 denote atomic groups selected from the groups of alkyl, alkoxyl, and halogen) in the amount of 0.1 to 10 parts by weight is added to 100 parts by weight of the ethylene-α-olefin copolymer.

(6) The flame retardant resin composition is characterized in that the acetate is one kind or a mixture of two or more kinds, having a particle diameter of 0.5 to 5 μm, selected from magnesium acetate, sodium acetate, potassium acetate, zinc acetate, copper acetate, ferrous acetate, calcium acetate, aluminum acetate, nickel acetate, cobalt acetate, gallium acetate, silver acetate, tin acetate, barium acetate, cerium acetate, lead acetate, and beryllium acetate.

(7) The flame retardant resin composition is characterized in that the primary particle diameter of the calcium carbonate is not greater than 4 μm.

(8) The flame retardant resin composition is characterized in that the calcium carbonate is one kind or a mixture of two or more kinds selected from calcium carbonate with its surface treated with a surface treatment agent such as a fatty acid type, oil and fat type, surface-active agent type, or wax type, or calcium carbonate with its surface treated with a coupling agent such as a silane type, titanate type, aluminum type, zirco-aluminum type, carboxylic acid type, or phosphate type.

[II] Insulated Wire (1) The invention provides an insulated wire having an insulation layer made of any of the flame retardant resin composition described in [I], (1) to (8), above.

(2) The insulated wire is characterized in that the insulation is cross-linked.

(3) The invention provides a thin-wall high-strength insulated wire having its conductor, whose outer diameter is 1.0 mm or less, covered with the flame retardant resin composition according to any of [I], (1) to (8), above to a thickness of from 0.1 mm to not greater than 1.0 mm and having the insulation cross-linked.

[III] Insulating Tube and others (1) The invention provides an insulating tube obtained by extrusion molding the flame retardant resin composition according to any of [I], (1) to (8), above into a tubular form.

(2) The tube is characterized in that the tube layer is cross-linked.

(3) The invention provides a heat shrinkable tube obtained, after a tube-formed molding made of the flame retardant resin composition according to any of [I], (1) to (8), above has been cross-linked, by expanding the tube-formed molding in its radial direction under a heated condition and, thereupon, cooling the expanded tube to fix its form.

[IV] Flat Cable (1) The invention provides a flat cable with a parallel arrangement of a plurality of spaced-apart conductors enclosed in an insulating layer, which is made of the flame retardant resin composition according to any of [1], (1) to (8), above.

(2) The flat cable is characterized in that the insulating layer is cross-linked.

(3) The flat cable is characterized in that at least one face of the insulating layer is laminated with a film made of a polymeric material.

(4) The flat cable is characterized in that the insulating layer is irradiated with ionizing radiation.

[V] High-voltage DC Electric Wire (1) The invention provides a high-voltage DC electric wire having its conductor provided thereon, as an insulating layer, with a coating of an ethylene-α-olefin copolymer resin composition and having the insulating layer provided thereon with a jacketing made of the flame retardant resin composition according to any of [1], (1) to (8), above.

(2) The high-voltage DC electric wire is characterized in that the insulating layer and jacketing are cross-linked.

Functions performed by the above-described aspects of the invention will be summarized as follows.

(i) Flame Retardant Resin Composition

The flame retardant resin composition obtained by having 100 parts by weight of thermoplastic resin compounded with 100 to 250 parts by weight of metal hydroxide and either 5 to 50 parts by weight of acetate or 5 to 80 parts by weight of calcium carbonate does not generate harmful gases such as hydrogen halide, e.g., hydrogen chloride when burned, exhibits flame retardance of an equivalent or higher level than that of PVC in the VW-1 test according to the UL Standards, and performs with excellent mechanical strength and, further, it can be used for flame retardant insulated wire, flat cable, and high-voltage DC electric wire.

(ii) Insulated Wire

By having a conductor coated with the flame retardant resin, a flame retardant insulated wire excellent in mechanical strength can be obtained.

By cross-linking the insulated wire, especially by irradiating it with ionizing radiation, an insulated wire and a flat cable excellent not only in flame retardance and mechanical strength but also in such properties as heat resistance, resistance to heat deformation, and resistance to chemicals can be obtained.

Such an insulated wire when cross-linked, even if the wire is of a structure having a thin-wall insulating coating applied on an extra fine conductor, can provide a non-halogen insulated wire exhibiting high strength and high flame retardance.

[iii] Insulating Tube

The flame retardant resin composition can be molded into a tubular form to provide an insulating tube.

The insulating tube that is cross-linked exhibits properties excellent not only in flame retardance and mechanical strength but also in such properties as heat resistance, resistance to heat deformation, and resistance to chemicals.

Such a tubular molding when cross-linked, especially radiated with ionizing radiation, and then processed to expand its diameter and keep its expanded form can be made into a heat-shrinkable tube excellent in flame retardance and mechanical strength.

(iv) Flat Cable

The flame retardant resin composition extruded to cover up both faces of parallel conductors formed by conductors arranged in parallel can provide a flame retardant flat cable excellent in mechanical strength.

The flat cable when cross-linked, especially radiated with ionizing radiation, can be made into a flat cable excellent not only in flame retardance and mechanical strength but also in such properties as heat resistance, resistance to heat deformation, and resistance to chemicals.

When the flame retardant resin composition is extruded by a melt-extruding method or the like onto one surface of a biaxially stretched polyester film to provide a laminated tape and two sheets of such laminated tape are placed on both faces of parallel conductors such that the resin composition layer is inside of the polyester film, thus forming an insulation of the parallel conductors by using a heat laminator, a flame retardant flat cable excellent in mechanical strength can be provided.

In this case, when the flat cable is cross-linked, especially irradiated with ionizing radiation, a flat cable excellent not only in flame retardance and mechanical strength but also in such properties as heat resistance, resistance to heat deformation, and resistance to chemicals can be provided.

(v) High-voltage DC Electric Wire

By extruding an ethylene-α-olefin copolymer resin composition as an insulation layer on a conductor and then extruding thereon the flame retardant resin composition as a jacketing, a flame retardant high-voltage DC electric wire excellent in mechanical strength and environmentally safe can be produced.

The high-voltage DC electric wire, when the insulation layer and the jacketing are cross-linked, and especially when they are irradiated by ionizing radiation, can exhibit properties excellent not only in flame retardance and mechanical strength but also in such properties as heat resistance, resistance to heat deformation, and resistance to chemicals.

The invention is described in more detail below.

(A) Flame Retardant Resin Compositions

The flame retardant resin composition according to the invention is basically obtained by compounding 100 parts by weight of thermoplastic resin with 100 to 250 parts by weight of metal hydroxide and either 5 to 50 parts by weight of acetate or 5 to 80 parts by weight of calcium carbonate.

(1) Thermoplastic Resin

The thermoplastic resins used as the base polymer of the flame retardant resin compositions can be cited by way of example and without limitation:

polyolefin, such as polyethylene and polypropylene;

ethylene-α-olefin copolymer, such as ethylene-vinyl acetate copolymer, ethylene-ethyl acrylate copolymer, ethylene-methyl methacrylate copolymer, ethylene-methacrylic acid copolymer, and ethylene-methyl acrylate copolymer;

thermoplastic elastomer such as polyolefin elastomer, including polyurethane elastomer, polyester elastomer, and ethylene-propylene copolymer elastomer, and polyamide elastomer; and polyester such as polyethylene terephthalate and polybutylene terephthalate. One of the thermoplastic resins may be used singly or two or more of them may be used in combination.

One kind or two or more kinds of the above ethylene-α-olefin copolymer selected from ethylene-vinyl acetate copolymer, ethylene-ethyl acrylate copolymer, ethylene-methyl methacrylate copolymer, ethylene-methacrylic acid copolymer, and ethylene-methyl acrylate copolymer may be preferably used singly or in combination from the point of view of flame retardance, flexibility, and the like. The ethylene-vinyl acetate copolymer especially gives good results from the viewpoint of flame retardance and the like.

When the ethylene-vinyl acetate copolymer is used, that containing 6 to 50% by weight, or preferably 10 to 48% by weight, of vinyl acetate component can be used favorably from the point of view of the balance between mechanical strength and flame retardance. As to the melt fluidity, when the melt flow rate (at 190° C. and under a load of 2.16 kg) is set within the range between 0.5 and 30, or preferably within the range between 0.5 and 20, favorable results can be obtained in view of extrusion workability and the like.

When the vinyl acetate content is less than 6% by weight, the flame retardance is decreased, and when it is more than 50% by weight, the mechanical strength is decreased.

Further, as to the melt flow rate of the ethylene-vinyl acetate copolymer, when it is less than 0.5, the surface of the extruded moldings tends to become rough and, when it is more than 30, the mechanical strength tends to decrease.

The conditions of the α-olefin content and the melt flow rate as said of the ethylene-vinyl acetate copolymer above are correspondingly applicable to the other ethylene-α-olefin copolymers.

In using the above ethylene-α-olefin copolymer, ethylene unsaturated compound other than the above exemplified α-olefin may be copolymerized according to need.

(2) Compounding Ingredients (i) Organosilicon Compound Coupling Agent

1) When an organosilicon compound coupling agent expressed as general formula [1]:

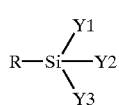

[1]

(where R denotes alkyl including acryl, methacryl, or allyl and Y1, Y2, and Y3 denote atomic groups selected from the groups of alkyl, alkoxyl, and halogen) in the amount of 0.1 to 10 parts by weight is added to 100 parts by weight of the thermoplastic resin, favorable results can be obtained from the viewpoint of physical properties.

2) As examples of the silane coupling agent expressed as general formula [1],

γ-methacryloxypropyltrimethoxysilane,
γ-methacryloxypropyltriethoxysilane,
γ-acryloxypropyltrimethoxysilane,
γ-methacryloxypropyldimethoxymethylsilane, and
γ-methacryloxypropyldimethylchlorosilane may be cited, and one or a mixture of two or more of them may be used.

(ii) Metal Hydroxide (a)

1) As examples of the metal hydroxide (a), magnesium hydroxide, calcium hydroxide, aluminum hydroxide, and the like can be cited. From the point of view of extrusion working temperature and the like of the resin composition, magnesium hydroxide and aluminum hydroxide are more preferably used.

As to the particle size of the used metal hydroxide (a), if that of 0.3 to 30 μm, or preferably that of 0.5 to 25 μm, in diameter and that of approximately 3 to 30 m²/g, or preferably that of 5 to 28 m²/g, in specific surface area by the BET method, is selected, satisfactory results can be obtained from the viewpoint of flame retardance, kneadability, extrusion workability, mechanical strength, and the like.

If the particle diameter of the metal hydroxide (a) is less than 0.3 μm, particles tend to stick together resulting in the increase of the kneading time and, if it exceeds 30 μm, the mechanical strength tends to decrease.

When the specific surface area of metal hydroxide (a) is less than 3 m²/g, the flame retardance tends to be lowered and, when it exceeds 30 m²/g, particles tend to readily stick together to prolong the kneading time.

2) Further, when the surface of the metal hydroxide (a) is treated with a surface treatment agent, good results can be obtained from the viewpoint of kneadability of the resin composition and elongation.

As examples of the surface treatment agent, anionic surface-active agents including fatty acid such as stearic acid and fatty acid metallic salt such as sodium stearate and sodium oleate can be cited.

3) Further, when the surface of the metal hydroxide is treated with an organosilicon compound coupling agent expressed as general formula [1], favorable results can be obtained from the viewpoint of physical property.

(iii) Acetate (b1)

The acetate (b1) used in combination with the metal hydroxide (a) in this invention is basically a compound expressed as general formula $M^n(CH_3COO)_n$, where $M^n$ denotes a cation whose valence is n.

As examples of the same, magnesium acetate, sodium acetate, potassium acetate, zinc acetate, copper acetate, ferrous acetate, calcium acetate, aluminum acetate, nickel acetate, cobalt acetate, gallium acetate, silver acetate, tin acetate, barium acetate, cerium acetate, lead acetate, and beryllium acetate can be cited.

As types of salt of the acetate (b1), there are normal salt, acid salt, basic salt, and polynuclear metallic complex salt, some of which containing crystal water can also be used.

Of those mentioned above, magnesium acetate, sodium acetate, zinc acetate, copper acetate, ferrous acetate, calcium acetate, aluminum acetate, nickel acetate, and barium acetate can be favorably used from the viewpoint of extrusion working temperature of the resin composition and the like.

As to the particle diameter of the acetate (b1), when that of 0.5 to 5 μm, preferably that of 0.5 to 3 μm, is selected, favorable results can be obtained from the viewpoint of not only the kneadability with the base polymer but also the melt extrusion workability when it is compounded with the base polymer to provide a resin composition. When the surface is treated with an anionic surface-active agent as with the metal hydroxide, such characteristics as the kneadability with the base polymer and the melt extrusion workability when made into a resin composition can be improved.

(iv) Calcium Carbonate (b2)

1) As examples of calcium carbonate (b2) to be used in combination with metal hydroxide (a) in this invention, heavy calcium carbonate obtained by pulverizing such as calcite, Iceland spar, aragonite, limestone, marble, and whiting, precipitated calcium carbonate as synthetic stone, and light calcium carbonate can be cited.

The crystal structure of the calcium carbonate (b2) takes on a rhombohedral calcite structure of a hexagonal system or an aragonite type structure of an orthorhombic system.

Synthetic calcium carbonate of the same, having uniform particle diameter distribution, is favorably used from the viewpoint of extrusion workability and physical properties.

As to the primary particle diameter of the calcium carbonate (b2), if that of not larger than 4 μm and preferably that of not larger than 3 μm, or more preferably not larger than 1 μm, is selected, favorable results can be obtained from the viewpoint of flame retardance, kneadability with the base polymer, and the like.

2) Further, if one kind or a mixture of two or more kinds selected from the group of calcium carbonate (b2) whose surface is treated with a surface treatment agent of fatty acid type, oil and fat type, surface-active agent type, wax type, and the like, or that whose surface is treated with a coupling agent of silane type, titanate type, aluminum type, zircoaluminum type, carboxylic acid type, phosphate type, and the like is used, such characteristics as kneadability can be improved with the base polymer and the melt extrusion workability when it is made into a resin composition.

(v) Compounded Amounts

1) As to the amount of metal hydroxide (a) and acetate (b1), or calcium carbonate (b2), to be compounded with the thermoplastic resin, favorable results are obtained from the viewpoint of flame retardance and mechanical strength when 100 to 250 parts by weight, or preferably 100 to 200 parts by weight, of metal hydroxide, in combination with 5 to 50 parts by weight, or preferably 10 to 40 parts by weight, of acetate, or with 5 to 80 parts by weight, or preferably 5 to 30 parts by weight, of calcium carbonate, were compounded with 100 parts by weight of the thermoplastic resin.

The flame retardance tends to deteriorate if the compounded amount of the metal hydroxide (a) is less than 100 parts by weight, regardless of the compounded amount of the acetate (b1) or that of the calcium carbonate (b2), and mechanical strength tends to decrease if the compounded amount of the metal hydroxide (a) exceeds 250 parts by weight.

Further, even if the compounded amount of the metal hydroxide (a) is within the range of 100 to 250 parts by weight, problems such as diminished flame retardance arise if the compounded amount of the acetate (b1) is less than 5 parts by weight or the compounded amount of the calcium carbonate (b2) is less than 5 parts by weight and that mechanical strength is decreased if the compounded amount of the acetate (b1) exceeds 50 parts by weight or the compounded amount of the calcium carbonate (b2) exceeds 80 parts by weight.

2) In the flame retardant resin composition of the invention, the drawback of the conventional thin-wall high-strength non-halogen insulating wires, tubes, heat-shrinkable tubes, or flat cables continuing to burn more than 20 seconds has been solved by mixing the thermoplastic resin with the acetate (b1) or calcium carbonate (b2) in an amount within a specific range, in addition to the metal hydroxide (a).

Further, it has also been found that, if the flame retardant resin composition is applied to the sheath for high voltage DC electric wire, the product can satisfy the vertical combustion test.

3) Mixing and Molding

In mixing the thermoplastic resin, the metal hydroxide, and the acetate or the calcium carbonate, a known mixing apparatus such as an open roll mixer, Bunbury mixer, pressure kneader, and biaxial mixer can be used.

From the thus obtained resin composition, various types of moldings for insulated wire, tube, heat-shrinkable tube, flat cable, high voltage DC electric wire, and the like can be easily produced by using a known resin molding apparatus for melt-extrusion and injection-molding.

(vi) Other Resin Components and Additives

1) The resin composition of the invention can, for the purpose of improving its characteristics, be mixed with various types of polymers such as EDPM and ethylene acrylic rubber within a range of an amount not impairing such characteristics as flame retardance and mechanical strength.

2) Further, various additives such as thermal stabilizer, antioxidant, ultraviolet absorber, lubricant, process stabilization auxiliary, coloring agent, foaming agent, reinforcing agent, organic or inorganic filler, and multifunctional monomer can be added to the resin composition.

3) The above multifunctional monomer, in particular, serves as a cross-linking assistant agent and, especially at the time of irradiation with ionizing radiation, improves the cross-linking effect. Hence, it may be added to the resin component according to need.

As examples of the multifunctional monomer, monomers containing plural portions of unsaturated linkage in the molecule such as trimethylolpropanetrimethacrylate, pentaerythritoltriacrylate, ethyleneglycoldimethacrylate, triallylcyanurate, and triallylisocyanurate can be cited.

(B) Various Moldings and Methods of Fabricating the Same (i) Fabrication of Insulated Wire and Flat Cable When a flame retardant resin composition of the invention is extruded by the use of a melt extruder or the like onto a conductor to cover the same, the product can be used as it is as a flame retardant insulated wire or a flat cable free from the problem of generating harmful gases when it is burned.

Further, if the thus obtained flat cable is sandwiched between two sheets of insulating polymeric film such as polyester film, the product can be used as a flame retardant flat cable free from the problem of generating harmful gases when burned.

When the insulation is cross-linked by the method of subjecting the insulated wire or the flat cable to irradiation of ionizing radiation or the like, the insulated wire or the flat cable can be made into one that is excellent in such characteristics as mechanical strength, heat resistance, and resistance to heat deformation.

(ii) Thin-wall High-strength Insulated Wire

1) The conventional resin composition made to be flame retardant by having a thermoplastic resin such as polyolefin compounded with a large amount of magnesium hydroxide as halogen-free flame retardant has good flame retardance. However, since it has poor compatibility with the thermoplastic resin when it is applied to an insulated wire, its initial tensile strength becomes low and, further, the physical property is greatly deteriorated when it is heat aged. This invention can solve such problems more effectively.

2) The inventors developed earlier a thin-wall high-strength non-halogen insulated wire in conformity with the UL Standards. While this insulated wire satisfies the requirement of extinction of a flame within 60 seconds as provided in the VW-1 test, it sometimes continues to burn 20 seconds or more and, hence, it has not been a satisfactory thin-wall high-strength non-halogen insulated wire. Therefore, the development of a non-halogen flame retardant electric wire having higher flame retardance has been desired. This invention can also solve this problem.

3) The flame retardant resin composition of the invention, by virtue of the characteristic feature of its composition, can provide a thin-wall, high-strength, and high flame retardant non-halogen insulated wire.

That is, the invention provides a thin-wall high-strength non-halogen insulated wire with a conductor whose outer diameter is not larger than 1.0 mm, preferably between 0.1 and 1.0 mm, covered with a flame retardant resin composition, and with the insulation cross-linked and, especially, irradiated with ionizing radiation.

If the insulation layer of a wire is less than 0.1 mm in thickness, its normal withstand voltage is rendered unpractical and, if the insulation thickness is more than 1.0 mm, there arises a problem related to the flame retardance in the case of the wire having a fine conductor which is used for wiring within an appliance.

4) This thin-wall high-strength insulated wire is suitable as an insulated wire for wiring within an appliance, satisfying various safety regulations such as the UL Standards and it is advantageous in that, while securing safety against fire, it produces no environmental pollution.

(iii) Fabrication of Insulating Tube, etc.

The flame retardant resin composition of the invention can be made into an insulating tube by such a method as melt extrusion.

The tubular molding of the flame retardant resin composition of the invention can be processed into a heat-shrinkable tube, first, by cross-linking it, especially by irradiating it with ionizing radiation and, then, by expanding it in its radial direction by such a method as to send compressed air into it at a high temperature and thereupon cooling it so that it maintains its expanded form.

(iv) Fabrication of High Voltage DC Electric Wire

A high voltage DC electric wire excellent in such characteristics as mechanical strength, heat resistance, and resistance to heat deformation can be obtained by extruding an insulation layer made of an ethylene-α-olefin copolymer resin composition on a conductor and then a jacketing made of the flame retardant resin composition of the invention thereon with a melt-extruder or the like, and further by cross-linking respective layers by applying an ionizing radiation or the like to them, and in particular by having a chemical cross-linking agent such as organic peroxide previously mixed in the insulation layer and the jacketing and by cross-linking each layer separately or both layers at the same time.

(v) Cross-linking, etc.

1) While electron beam, accelerated electron beam, gamma ray, beta ray, X-ray, alpha ray, ultraviolet ray, and the like can be cited as examples of the ionizing radiation, the accelerated electron beam can be used most favorably from the viewpoint of its industrial utilization, such as handiness of the beam source, the thickness penetrated by the ionizing radiation, and the speediness in the cross-linking process.

As to the exposure dose of the ionizing radiation, it is favorable when the electron beam, for example, is used, between 3 and 50 Mrad, or preferably between 5 and 25 Mrad.

If the exposure dose is under 3 Mrad, the effect of improving the tensile strength is a little and, if it is over 50 Mrad, the elongation is conversely decreased.

2) Instead of radiating with ionizing radiation, a chemical cross-linking method can also be used in which an organic peroxide or the like is previously mixed in the flame retardant resin composition and, after the extrusion, the product is heat treated.

As examples of the organic peroxide, dicumylperoxide, bis(t-butylperoxyisopropyl)peroxide, and the like can be cited.

However, irradiation with ionizing radiation is more preferable for satisfying both properties of the initial mechanical strength and the flame retardance.

BEST MODE FOR CARRYING OUT THE INVENTION

Figure 1:
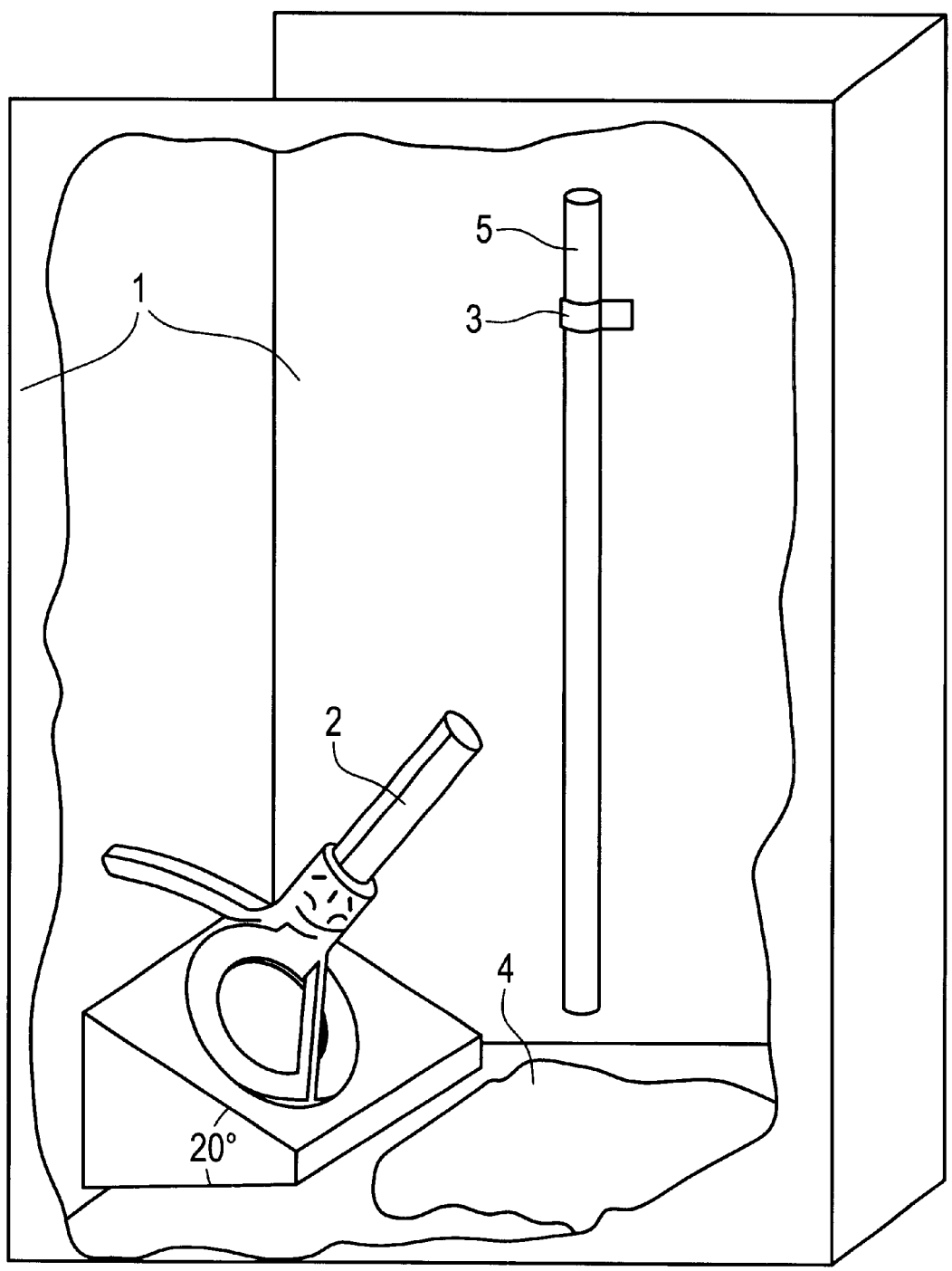
FIG. 1 is a schematic diagram showing a combustion testing apparatus for illustrating the vertical combustion test (VW - 1 test) according to the UL Standards.

While the invention will be described as related to some examples below, the scope of the invention may not be limited by any of the details of the description. Measurement of Physical Properties

(1) On Insulated Wire:

1) Flame Retardance Test

To evaluate the flame retardance, the VW-1 test according to the UL Standards was carried out on 10 specimens of each example. If even one of the 10 specimens of each example burned over 60 seconds, absorbent cotton placed thereunder was burned due to burning droppings from the specimen, or a sheet of kraft paper fixed thereabove was burned or scorched, the example was judged to have failed the test.

Burning times of the 10 specimens were classified into the ranges of 0 seconds to under 20 seconds, 20 seconds to under 40 seconds, 40 seconds to under 60 seconds, and 60 seconds and over. When all of the specimens ceased to flame within 40 seconds of the application of the gas flame, the example was judged to be good.

2) Physical Property

The tensile strength and elongation (gauge length: 50 mm) were measured on three specimens of each example according to the measuring method specified in JIS C3005 and the average values were calculated.

A tensile test (pulling speed: 500 mm/min) was carried out on extruded covering material and the tensile strength and elongation (gauge length: 20 mm) were measured on three specimens of each example and the average values were calculated.

(2) On Insulating Tube:

1) Flame Retardance Test

An iron bar having the diameter 6.4mm equal to the inner diameter of a tube was inserted into a tube and the all-tubing flame test was carried out on 10 specimens of each example. If even one of the 10 specimens failed in the test by causing it to burn over 60 seconds, burn the kraft paper, or burn the absorbent cotton, the example was judged to have failed the test. Burning times of the 10 specimens were classified into the ranges of 0 seconds to under 20 seconds, 20 seconds to under 40 seconds, and 40 seconds to under 60. When all of the specimens ceased to flame within 40 seconds of the application of the gas flame, the example was judged to be good.

2) Physical Property

To evaluate the mechanical strength of the tube, the tensile test conforming to the method specified in JIS C3005 (pulling speed: 500 mm/min) was carried out and the tensile strength and elongation (gauge length: 20 mm) were measured on three specimens of each example and the average values were calculated.

(3) On Heat-shrinkable Tube:

1) Flame Retardance Test

An iron bar of 3.3 mm in diameter was inserted into a heat-shrinkable tube whose inner diameter had been expanded to 7 mm and the specimen was put in a constant-temperature bath at 150° C. and kept therein for three minutes so that the heat-shrinkable tube was heat-shrunk to fit over the periphery of the iron bar. The all-tubing flame test was carried out on 10 specimens of each example. If even one of the 10 specimens failed in the test by causing it to burn over 60 seconds, burn the kraft paper, or burn the absorbent cotton, the example was judged to have failed the test.

2) Physical Property

To evaluate the mechanical strength of the heat-shrinkable tube, the tensile test (pulling speed: 500 mm/min) conforming to the method specified in JIS C3005 was carried out on the specimens of the heat-shrinkable tube heat-shrunk by being kept for three minutes in a constant-temperature bath set at 150° C. and the tensile strength and elongation (gauge length: 20 mm) were measured on three specimens of each example and the average values were calculated.

(4) On High Voltage DC Electric Wire:

1) Flame Retardance According to UL Standards

To evaluate the flame retardance, the VW-1 test according to the UL Standards was carried out on 10 specimens of each example.

If even one of the 10 specimens of each example burned over 60 seconds, absorbent cotton placed thereunder was burned due to burning droppings from the specimen, or a sheet of kraft paper fixed thereabove was burned or scorched, the example was judged to have failed the test.

2) Physical Property

A tensile test (pulling speed: 500 mm/min) was carried out on the extruded jacketing and the tensile strength and elongation (gauge length: 20 mm) were measured on three specimens of each example and the average values were calculated.

3) Heat-Aged Physical Property

Wire specimens were heat-aged by being kept in a Geer oven at 158° C. for seven days and thereafter the residual elongation rate of the jacketing was evaluated.

Here, the residual elongation rate is defined by the formula, "residual elongation rate (%)=(elongation of heat aged specimen/initial elongation)×100". Having a residual elongation rate of 65% or more was judged to have passed.

4) High-voltage Cut-through Test

Figure 2:
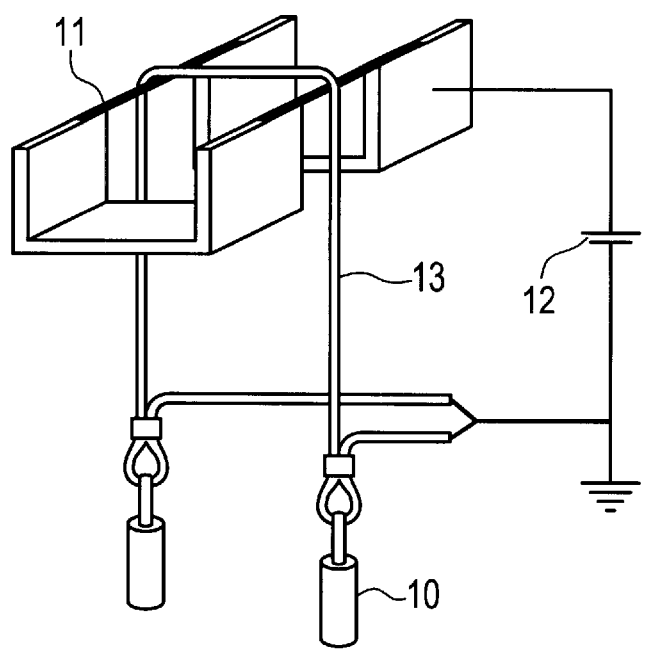
FIG. 2 is a schematic diagram for illustrating the high-voltage cut-through test according to the UL Standards, Subject 758.

FIG. 2 is a schematic diagram for explaining the high-voltage cut-through test according to Subject 758 of the UL Standards.

As shown in FIG. 2, loads 10 of one pound each were applied to both ends of a wire 13 which was passed over and hung down from two parallel drill rods 11, 1/32" in diameter, in a bath set at 125° C. and a voltage of 1.5 times as high as the rated voltage was applied thereto from the DC power source 12. Then, if a breakdown took place within 7 hours, the specimen was judged to have failed. This test was measured on three specimens.

5) Withstand Voltage Test (Method II)

Figure 3:
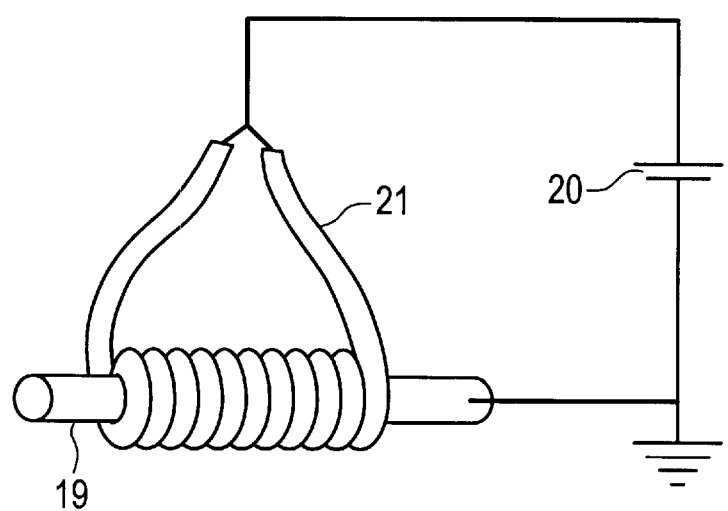
FIG. 3 is a schematic diagram for illustrating the withstand voltage test (Method II) according to the UL Standards.

FIG. 3 is a schematic diagram for explaining the withstand voltage test (Method II) according to the UL Standards.

After electric wire specimens were heat-aged by being kept in a Geer oven at 158° C. for seven days, the wire 21 was wound seven turns around a mandrel, 0.5 inch in outer diameter. When a voltage of 1.25 times as high as the rated voltage was applied to the wire in the Geer oven at 125° C., if a breakdown took place within seven hours, the specimen was judged to have failed. This test was measured on three specimens.

<Preparation of Flame Retardant Resin Compositions>

The resin compositions shown in Tables 1 to 14 were kneaded by a pressure kneader set at 140° C. and the thus kneaded compounds were formed into pellets by using a feeder-extruder.

In the preparation of the resin compositions shown in Tables 1 to 14, 0.5 part by weight of amide oleate and 1 part by weight of pentaerythritol-tetrakis [3-(3,5-t-butyl-hydroxyphenyl)propionate] were commonly added to 100 parts by weight each of the base polymers shown in Tables 1 to 14. (A) Insulated Wire - 1:

EXAMPLES 1 to 14

The pellets shown in Tables 1–3 were extruded by the use of a melt extruder (full flight type, 45 mm in diameter, L/D=24, compression ratio =2.5) to cover a conductor (tinned annealed copper wire 0.8 mm in diameter) with a layer of 0.40 mm in thickness. The thus obtained article was irradiated by an electron beam of 200 kGy at an accelerating voltage of 2 MeV to provide a specimen.

The electron beam irradiation process was omitted with Example 7 in Table 1, Example 14 in Table 2, and Comparative Example 5 in Table 3.

Examples 1 to 7 shown in Table 1 are insulated wires produced by using resin compositions in which 100 parts by weight of ethylene-vinyl acetate copolymer resin were compounded with 150 to 190 parts by weight of magnesium hydroxide as metal hydroxide and 10 to 50 parts by weight of magnesium acetate or calcium acetate as acetate.

Further, Examples 8 to 14 shown in Table 2 are insulated wires produced by using resin compositions in which 100 parts by weight of ethylene-vinylacetate copolymer resin were compounded with 150 to 190 parts by weight of magnesium hydroxide as metal hydroxide and 10 to 50 parts by weight of calcium carbonate.

All of the specimens of the examples passed the VW-1 test, the distribution of the burning times has been mostly within 0 to 20 seconds, and the burning time at the longest has been under 40 seconds.

Further, the specimens produced by using the resin compositions of Examples 3 to 6 and 10 to 13 with γ-methacryloxypropyltrimetoxisilane added thereto as a silane coupling agent have been found to exhibit such mechanical strength as to exceed the values provided in the UL Standards, namely, over 1.06 kg/mm² in tensile strength and over 100% in elongation.

Comparative Examples 1 to 7

Comparative Examples 1 to 6 shown in Table 3 are insulated wires produced by using resin compositions in which 100 parts by weight of ethylene-vinylacetate copolymer were compounded with 180 to 250 parts by weight of magnesium hydroxide as metal hydroxide.

When the VW-1 test was carried out on the insulated wires made of the resin composition of Comparative Examples 1 to 5 in Table 3, all of the specimens passed the test, however, the burning times of many of the specimens were distributed in the ranges of 20 to 40 seconds and 40 to 60 seconds, from which it was found that they were inferior in flame retardance to Examples 1 to 7 in Table 1 with acetate added thereto or Examples 8 to 14 in Table 2 with calcium carbonate added thereto.

Specimens of Comparative Example 6 passed the VW-1 test and many of the burning times were distributed in the range of 0 to 20 seconds to prove excellence in flame retardance, but their tensile strength did not satisfy the UL Standard and their elongation also was under 100%.

Comparative Example 7 in Table 3 is an insulated wire produced by using PVC composition and it can be seen that all the specimens ceased to flame within 20 seconds.

TABLE 1

| Insulated Wire | Example | | | | | | |
|---|---|---|---|---|---|---|---|
| (conductor 0.8 mm φ, Insul. Layer 0.4 mm thick) | 1 | 2 | 3 | 4 | 5 | 6 | 7 |
| Ethylene-vinylacetate copolymer (*1) | 100 | | 100 | | 100 | 100 | 100 |
| Ethylene-vinylacetate copolymer (*2) | | 100 | | 100 | | | |
| Magnesium hydroxide (*3) | 180 | 150 | | | 150 | | 180 |
| Magnesium hydroxide (*4) | | | 150 | 190 | | 180 | |
| Magnesium acetate (*5) | 20 | 50 | | 10 | 30 | | |
| Calcium acetate (*6) | | | 30 | | | 20 | 10 |
| γ-methacryloxypropyltrimetoxisilane | | | 1 | 2 | 2 | 1 | |
| Electron beam exposure dose (kGy) | 200 | 200 | 200 | 200 | 200 | 200 | 0 |
| Longest burning time distribution (Number of specimens: 10) | | | | | | | |
| 0 to under 20 sec. | 8/10 | 10/10 | 9/10 | 6/10 | 8/10 | 7/10 | 7/10 |
| 20 to under 40 sec. | 2/10 | 0/10 | 1/10 | 4/10 | 2/10 | 3/10 | 3/10 |
| 40 to under 60 sec. | 0/10 | 0/10 | 0/10 | 0/10 | 0/10 | 0/10 | 0/10 |
| 60 sec. or over | 0/10 | 0/10 | 0/10 | 0/10 | 0/10 | 0/10 | 0/10 |
| Flame retardance VW-1 test (UL Std.) | | | | | | | |
| Judgment | Passed | Passed | Passed | Passed | Passed | Passed | Passed |
| Initial tensile strength (kg/mm$^2$) | 0.80 | 0.74 | 1.15 | 1.20 | 1.38 | 1.25 | 0.55 |
| Initial elongation (%) | 350 | 255 | 170 | 140 | 230 | 150 | 650 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, surface treated with stearic acid
(*4) Average particle diameter = 0.7 μm, BET specific surface area = 7 m$^2$/g, Surface not treated
(*5) Made by Wako Jun-yaku K.K., Average particle diameter = 3 μm
(*6) Made by Wako Jun-yaku K.K., Average particle diameter = 3 μm

TABLE 2

| Insulated Wire | Example | | | | | | |
|---|---|---|---|---|---|---|---|
| (conductor 0.8 mm φ, Insul. Layer 0.4 mm thick) | 8 | 9 | 10 | 11 | 12 | 13 | 14 |
| Ethylene-vinylacetate copolymer (*1) | 100 | | 100 | | 100 | 100 | 100 |
| Ethylene-vinylacetate copolymer (*2) | | 100 | | 100 | | | |
| Magnesium hydroxide (*3) | 180 | 150 | | | 150 | | 180 |
| Magnesium hydroxide (*4) | | | 150 | 190 | | 180 | |
| Magnesium acetate (*5) | 20 | 50 | | 10 | 30 | | |
| Calcium acetate (*6) | | | 30 | | | 20 | 10 |
| γ-methacryloxypropyltrimetoxisilane | | | 1 | 2 | 2 | 1 | |
| Electron beam exposure dose (kGy) | 200 | 200 | 200 | 200 | 200 | 200 | 0 |
| Longest burning time distribution (Number of specimens: 10) | | | | | | | |
| 0 to under 20 sec. | 7/10 | 6/10 | 6/10 | 8/10 | 5/10 | 7/10 | 5/10 |
| 20 to under 40 sec. | 3/10 | 4/10 | 4/10 | 2/10 | 5/10 | 3/10 | 5/10 |
| 40 to under 60 sec. | 0/10 | 0/10 | 0/10 | 0/10 | 0/10 | 0/10 | 0/10 |
| 60 sec. or over | 0/10 | 0/10 | 0/10 | 0/10 | 0/10 | 0/10 | 0/10 |
| Flame retardance VW-1 test (UL Std.) | | | | | | | |
| Judgment | Passed | Passed | Passed | Passed | Passed | Passed | Passed |
| Initial tensile strength (kg/mm$^2$) | 0.64 | 0.50 | 1.15 | 1.20 | 1.20 | 1.11 | 0.40 |
| Initial elongation (%) | 310 | 440 | 155 | 200 | 230 | 135 | 720 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, Surface treated with stearic acid
(*4) Average particle diameter = 0.7 μm, BET specific surface area = 7 m$^2$/g, Surface not treated
(*5) Primary particle diameter = 0.04 μm, Surface treated with stearic acid
(*6) Primary particle diameter = 1.5 μm, Surface not treated

TABLE 3

| Insulated Wire | Comparative Example | | | | | | |
|---|---|---|---|---|---|---|---|
| (conductor 0.8 mm φ, Insul. Layer 0.4 mm thick) | 1 | 2 | 3 | 4 | 5 | 6 | 7 |
| Ethylene-vinylacetate copolymer (*1) | 100 | | 100 | | 100 | 100 | PVC |
| Ethylene-vinylacetate copolymer (*2) | | 100 | | 100 | | | compo- |
| Magnesium hydroxide (*3) | 200 | 200 | | | 180 | 250 | sition |
| Magnesium hydroxide (*4) | | | 180 | 200 | | | |
| γ-methacryloxypropyltrimetoxisilane | | | 1 | 2 | | | |
| Electron beam exposure dose (kGy) | 200 | 200 | 200 | 200 | 0 | 200 | 100 |
| Longest burning time distribution (Number of specimens: 10) | | | | | | | |
| 0 to under 20 sec. | 0/10 | 1/10 | 0/10 | 1/10 | 0/10 | 6/10 | 10/10 |
| 20 to under 40 sec. | 1/10 | 5/10 | 5/10 | 4/10 | 0/10 | 2/10 | 0/10 |
| 40 to under 60 sec. | 9/10 | 3/10 | 5/10 | 5/10 | 10/10 | 2/10 | 0/10 |
| 60 sec. or over | 0/10 | 0/10 | 0/10 | 0/10 | 0/10 | 0/10 | 0/10 |
| Flame retardance VW-1 | | | | | | | |
| Judgment | Passed | Passed | Passed | Passed | Passed | Passed | Passed |
| Initial tensile strength (kg/mm$^2$) | 0.78 | 0.74 | 1.28 | 1.20 | 0.45 | 0.44 | 1.79 |
| Initial elongation (%) | 420 | 255 | 150 | 140 | 800 | 80 | 250 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, Surface treated with stearic acid
(*4) Average particle diameter = 0.7 μm, BET specific surface area = 7 m$^2$/g, Surface not treated (B) Insulated Wire -2:

EXAMPLES 15 to 22

The flame retardant resin compositions shown in Tables 4 and 5 were extruded by the use of a melt extruder (full flight type, 45 mm in diameter, L/D=24, compression ratio=2.5) to cover a conductor (tinned annealed copper wire 0.8 mm in diameter) with a layer of 0.80 mm in thickness. The obtained article was then irradiated by an electron beam of 200 kGy at an accelerating voltage of 2 MeV to provide a specimen.

The physical properties of the insulated wires were assessed in the same way as applied to Examples 1 to 14.

Examples 15 to 22 shown in Table 4 include insulated wires produced by using resin compositions in which 100 parts by weight of ethylene-vinylacetate copolymer resin were compounded with 150 to 190 parts by weight of magnesium hydroxide as metal hydroxide and 10 to 50 parts by weight of magnesium acetate or calcium acetate as acetate and insulated wires produced by using resin compositions in which 100 parts by weight of ethylene-vinylacetate copolymer resin were compounded with 150 to 190 parts by weight of magnesium hydroxide as metal hydroxide and 10 to 50 parts by weight of calcium carbonate.

All of the specimens of the examples passed the VW-1 test and many of them have been extinguished within 20 seconds to prove their excellence in flame retardance.

Further, the specimens produced by using the resin compositions of Examples 17 and 18, and 21 and 22 in Table 4 with γ-methacryloxypropyltrimetoxisilane added thereto as a silane coupling agent have been found to exhibit such mechanical strength as to exceed the values provided in the UL Standards, over 1.06 kg/mm$^2$ in tensile strength and over 100% in elongation.

COMPARATIVE EXAMPLES 8 to 12

Comparative Examples 8 to 11 shown in Table 5 are insulated wires produced by using resin compositions in which 100 parts by weight of ethylene-vinylacetate copolymer were compounded with 180 to 200 parts by weight of magnesium hydroxide as metal hydroxide.

In the VW-1 test performed on the insulated wires produced by using the resin compositions of Comparative Examples 8 to 11, all of the specimens passed the test, however, the burning times of many of them were distributed in the ranges of 20 to 40 seconds and 40 to 60 seconds, from which it was found that they were inferior in flame retardance to Examples 15 to 18 in Table 4 with acetate added thereto or Examples 19 to 22 with calcium carbonate added thereto.

Comparative Example 12 is an insulated wire made of PVC composition and it can be seen that all of the specimens ceased to flame within 20 seconds of the application.

TABLE 4

| Insulated Wire | Example | | | | | | | |
|---|---|---|---|---|---|---|---|---|
| (conductor 0.8 mm φ, Insul. Layer 0.8 mm thick) | 15 | 16 | 17 | 18 | 19 | 20 | 21 | 22 |
| Ethylene-vinylacetate copolymer (*1) | 100 | | 100 | | 100 | | 100 | |
| Ethylene-vinylacetate copolymer (*2) | | 100 | | 100 | | 100 | | 100 |
| Magnesium hydroxide (*3) | 190 | 160 | | | 190 | 160 | | |
| Magnesium hydroxide (*4) | | | 160 | 150 | | | 160 | 150 |
| Magnesium acetate (*5) | 10 | 40 | | 50 | | | | |
| Calcium acetate (*6) | | | 20 | | | | | |
| Calcium carbonate (*7) | | | | | 10 | 40 | | 50 |
| Calcium carbonate (*8) | | | | | | | 20 | |
| γ-methacryloxypropyltrimetoxisilane | | | 1 | 2 | | | 1 | 2 |
| Electron beam exposure dose (kGy) | 200 | 200 | 200 | 200 | 200 | 200 | 200 | 200 |

TABLE 4-continued

| Insulated Wire | Example | | | | | | | |
|---|---|---|---|---|---|---|---|---|
| (conductor 0.8 mm φ, Insul. Layer 0.8 mm thick) | 15 | 16 | 17 | 18 | 19 | 20 | 21 | 22 |
| Longest burning time distribution (Number of specimens: 10) | | | | | | | | |
| 0 to under 20 sec. | 9/10 | 9/10 | 8/10 | 7/10 | 8/10 | 7/10 | 7/10 | 6/10 |
| 20 to under 40 sec. | 1/10 | 1/10 | 2/10 | 3/10 | 2/10 | 3/10 | 3/10 | 4/10 |
| 40 to under 60 sec. | 0/10 | 0/10 | 0/10 | 0/10 | 0/10 | 0/10 | 0/10 | 0/10 |
| 60 sec. or over | 0/10 | 0/10 | 0/10 | 0/10 | 0/10 | 0/10 | 0/10 | 0/10 |
| Flame retardance VW-1 | | | | | | | | |
| Judgment | Passed | Passed | Passed | Passed | Passed | Passed | Passed | Passed |
| Initial tensile strength (kg/mm$^2$) | 0.75 | 0.85 | 1.23 | 1.30 | 0.65 | 0.80 | 1.35 | 1.20 |
| Initial elongation (%) | 380 | 275 | 165 | 240 | 200 | 360 | 140 | 310 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, surface treated with stearic acid
(*4) Average particle diameter = 0.7 μm, BET specific surface area = 7 m$^2$/g, Surface not treated
(*5) Made by Wako Jun-yaku K.K., Average particle diameter = 3 μm
(*6) Made by Wako Jun-yaku K.K., Average particle diameter = 3 μm
(*7) Primary particle diameter = 0.04 μm, Surface treated with stearic acid
(*8) Primary particle diameter = 1.5 μm, Surface not treated

TABLE 5

| Insulated Wire | Comparative Example | | | | |
|---|---|---|---|---|---|
| (conductor 0.8 mm φ, Insul. Layer 0.8 mm thick) | 8 | 9 | 10 | 11 | 12 |
| Ethylene-vinylacetate copolymer (*1) | 100 | | 100 | | PVC |
| Ethylene-vinylacetate copolymer (*2) | | 100 | | 100 | compo- |
| Magnesium hydroxide (*3) | 200 | 200 | | | sition |
| Magnesium hydroxide (*4) | | | 180 | 200 | |
| γ-methacryloxypropyltrimetoxisilane | | | 1 | 2 | |
| Electron beam exposure dose (kGy) | 200 | 200 | 200 | 200 | 100 |
| Longest burning time distribution (Number of specimens: 10) | | | | | |
| 0 to under 20 sec. | 0/10 | 1/10 | 0/10 | 1/10 | 10/10 |
| 20 to under 40 sec. | 4/10 | 4/10 | 5/10 | 4/10 | 0/10 |
| 40 to under 60 sec. | 6/10 | 6/10 | 5/10 | 5/10 | 0/10 |
| 60 sec. or over | 0/10 | 0/10 | 0/10 | 0/10 | 0/10 |
| Flame retardance VW-1 test (UL Std.) | | | | | |
| Judgment | Passed | Passed | Passed | Passed | Passed |
| Initial tensile strength (kg/mm$^2$) | 0.68 | 0.80 | 1.31 | 1.35 | 1.65 |
| Initial elongation (%) | 440 | 230 | 145 | 135 | 270 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, Surface treated with stearic acid
(*4) Average particle diameter = 0.7 μm, BET specific surface area = 7 m$^2$/g, Surface not treated (C) Insulating Tube - 1

EXAMPLES 23 to 28

Flame retardant resin compositions shown in Tables 6 and 7 were formed into tubular moldings having an inner diameter of 6.4 mm and a wall thickness of 0.5 mm by using a melt extruder (full flight type, 45 mm in diameter, L/D=24, compression ratio=2.5) at 160° C. The tube-shaped moldings were irradiated by 100 kGy of electron beam at an accelerating voltage of 2 MeV so as to be cross-linked.

The electron beam irradiation was not subjected to the process for the tubes of Examples 25 and 28 in Table 6 and Comparative Example 15 in Table 7.

To evaluate the thus obtained tube for its flame retardance, an iron bar of 6.4 mm diameter, the same size as the inner diameter of the tube, was inserted into the tube and the all-tubing flame test was carried out on 10 specimens of each example. If even one of the 10 specimens of each example caused it to burn 60 seconds or more, burn the kraft paper, or burn the absorbent cotton, the example was judged to have failed the test.

Further, to evaluate the tubes for their mechanical strength, a tensile test (pulling speed: 500 mm/min.) was carried out and the tensile strength and the elongation (gauge length: 20 mm) of three specimens of each example were measured and the average values were calculated.

Examples 23 to 28 in Table 6 are tubes produced by using the resin compositions of Examples 1, 3, and 7 with acetate added thereto and tubes produced by using the resin compositions of Examples 8, 10, and 14 with calcium carbonate added thereto, respectively.

All of the specimens passed the all-tubing flame test and the distribution of the burning times was in the range of less than 20 seconds with a probability over 50%.

With respect to the tubes of Examples 24 and 27 in Table 6 with γ-methacryloxypropyltrimetoxisilane added thereto as a silane coupling agent, it was found that they not only prove to be flame retardant but also satisfy the requirements provided in the UL Standards, over 1.06 kg/mm2 in tensile strength and over 100% in elongation

COMPARATIVE EXAMPLES 13–15

Comparative Examples 13 to 15 in Table 7 are tubes using the resin compositions of Comparative Examples 1, 3, and 5, respectively. Although they all passed the all tubing flame test, the combustion times of more than 50% were distributed in the range exceeding 20 seconds, from which these examples were found to be inferior in flame retardance to Examples 23 to 25 in Table 6 containing acetate and Examples 26 to 28 in Table 6 containing calcium carbonate.

TABLE 6

| Tube | Example | | | | | |
|---|---|---|---|---|---|---|
| (Inner diameter 6.4 mm φ, Wall thickness 0.5 mm) | 23 | 24 | 25 | 26 | 27 | 28 |
| Ethylene-vinylacetate copolymer (*1) | 100 | 100 | 100 | 100 | 100 | 100 |
| Ethylene-vinylacetate copolymer (*2) | | | | | | |
| Magnesium hydroxide (*3) | 180 | | 180 | 180 | | 180 |
| Magnesium hydroxide (*4) | | 150 | | | 150 | |
| Magnesium acetate (*5) | 20 | | | | | |
| Calcium acetate (*6) | | 30 | 10 | | | |
| Calcium carbonate (*7) | | | | 20 | | |
| Calcium carbonate (*8) | | | | | 30 | 10 |
| γ-methacryloxypropyltrimetoxisilane | | 1 | | | 1 | |
| Electron beam exposure dose (kGy) | 100 | 100 | 0 | 100 | 100 | 0 |
| Longest burning time distribution (Number of specimens: 10) | | | | | | |
| 0 to under 20 sec. | 7/10 | 7/10 | 6/10 | 8/10 | 5/10 | 7/10 |
| 20 to under 40 sec. | 3/10 | 3/10 | 4/10 | 2/10 | 5/10 | 3/10 |
| 40 to under 60 sec. | 0/10 | 0/10 | 0/10 | 0/10 | 0/10 | 0/10 |
| 60 sec. or over | 0/10 | 0/10 | 0/10 | 0/10 | 0/10 | 0/10 |
| Flame retardance VW-1 test (UL Std.) | | | | | | |
| Judgment | Passed | Passed | Passed | Passed | Passed | Passed |
| Initial tensile strength (kg/mm$^2$) | 0.95 | 1.24 | 0.65 | 0.75 | 1.15 | 0.38 |
| Initial elongation (%) | 368 | 188 | 700 | 295 | 175 | 720 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, Surface treated with stearic acid
(*4) Average particle diameter = 0.7 μm, BET specific surface area = 7 m$^2$/g, Surface not treated
(*5) Made by Wako Jun-yaku K.K., Average particle diameter = 3 μm
(*6) Made by Wako Jun-yaku K.K., Average particle diameter = 3 μm
(*7) Primary particle diameter = 0.04 μm, Surface treated with stearic acid
(*8) Primary particle diameter = 1.5 μm, Surface not treated

TABLE 7

| Tube (Inner diameter 6.4 mm φ, Wall thickness 0.5 mm) | Comparative Example | | |
|---|---|---|---|
| | 13 | 14 | 15 |
| Ethylene-vinylacetate copolymer (*1) | 100 | 100 | 100 |
| Ethylene-vinylacetate copolymer (*2) | | | |
| Magnesium hydroxide (*3) | 200 | | 180 |
| Magnesium hydroxide (*4) | | 180 | |
| γ-methacryloxypropyltrimetoxisilane | | 1 | |
| Electron beam exposure dose (kGy) | 100 | 100 | 0 |
| Longest burning time distribution (Number of specimens: 10) | | | |
| 0 to under 20 sec. | 0/10 | 1/10 | 0/10 |
| 20 to under 40 sec. | 2/10 | 7/10 | 2/10 |
| 40 to under 60 sec. | 8/10 | 2/10 | 8/10 |
| 60 sec. or over | 0/10 | 0/10 | 0/10 |
| Flame retardance VW-1 | | | |
| Judgment | Passed | Passed | Passed |
| Initial tensile strength (kg/mm$^2$) | 0.82 | 1.21 | 0.55 |
| Initial elongation (%) | 385 | 165 | 850 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, Surface treated with stearic acid
(*4) Average particle diameter = 0.7 μm, BET specific surface area = 7 m$^2$/g, Surface not treated (D) Heat-shrinkable Tube - 1

EXAMPLES 29 and 30

Flame retardant resin compositions shown in Table 8 were formed into tube-shaped moldings with an inner diameter of 3.2 mm and a wall thickness of 0.5 mm by using a melt extruder (full flight type, 45 mm in diameter, L/D=24, compression ratio=2.5) at 160° C. The tube-shaped moldings were irradiated by 100 kGy of electron beam at an accelerating voltage of 2 MeV to be cross-linked.

The cross-linked tubes were left to be preheated in a constant-temperature bath set at 160° C. for three minutes. Then, by a method of sending compressed air into the tube, the tube as expanded to increase the inner diameter to 7 mm and, thereupon, the tubes were removed from the constant-temperature bath and cooled in water so that the tubes would maintain the expanded shape to provide heat-shrinkable tubes.

To evaluate the flame retardance of the obtained heat-shrinkable tube, an iron bar with an outer diameter of 3.3 mm was inserted into the heat-shrinkable tube having its diameter expanded to 7 mm and then the tube was left in a constant-temperature bath set at 150° C. for three minutes so that the heat-shrinkable tube would be heat-shrunk to fit over the periphery of the iron bar. 10 specimens of each example were subjected to the all-tubing test, in which, if one of the 10 specimens caused it to burn 60 seconds or more, burn the kraft paper, or burn the absorbent cotton, the example was judged to have failed the test.

Further, to evaluate the mechanical strength of the tube, specimens of the heat-shrinkable tube, which had been heat-shrunk by being left for three minutes in a constant-temperature bath set at 150° C., were subjected to a tensile test (pulling speed 500 mm/min) and the tensile strength and elongation (gauge length 20 mm) were measured on three specimens of each example and the average values were calculated.

Examples 29 and 30 in Table 8 are heat-shrinkable tubes produced by using the resin compositions of Examples 1 and 8 in Table 1. All of them passed the all tubing test and the burning times of many of them have been distributed in the range between 0 and 20 seconds to prove their excellence in flame retardance.

COMPARATIVE EXAMPLE 16

Comparative Example 16 in Table 8 is a heat-shrinkable tube produced by using the resin compositions of Comparative Example 1. Though all of the specimens of this comparative example passed the all-tubing test, many of the burning times were distributed in the range between 40 and 60 seconds to indicate that they were inferior in flame retardance to Example 29 in Table 8 with acetate added thereto and Example 30 in Table 8 with calcium carbonate added thereto.

TABLE 8

| Tube (Heat-shrunk inner diameter 3.2 mm φ, Wall thickness 0.5 mm) | Example | | Comparative Example |
|---|---|---|---|
| | 29 | 30 | 16 |
| Ethylene-vinylacetate copolymer (*1) | 100 | 100 | 100 |
| Ethylene-vinylacetate copolymer (*2) | | | |
| Magnesium hydroxide (*3) | 180 | 180 | 200 |
| Magnesium hydroxide (*4) | | | |
| Magnesium acetate (*5) | 20 | | |
| Calcium acetate (*6) | | | |
| Calcium carbonate (*7) | | 20 | |
| Calcium carbonate (*8) | | | |
| γ-methacryloxypropyltrimetoxisilane | | | |
| Electron beam exposure dose (kGy) | 100 | 100 | 100 |
| Longest burning time distribution (Number of specimens: 10) | | | |
| time 0 to under 20 sec. | 8/10 | 7/10 | 0/10 |
| 20 to under 40 sec. | 2/10 | 3/10 | 3/10 |
| 40 to under 60 sec. | 0/10 | 0/10 | 7/10 |
| 60 sec. or over | 0/10 | 0/10 | 0/10 |
| Flame retardance VW-1 test (UL Std.) | | | |
| Judgment | Passed | Passed | Passed |
| Initial tensile strength (kg/mm$^2$) | 0.90 | 0.75 | 0.78 |
| Initial elongation (%) | 385 | 310 | 390 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m$^2$/g, Surface treated with stearic acid
(*4) Average particle diameter = 0.7 μm, BET specific surface area = 7 m$^2$/g, Surface not treated
(*5) Made by Wako Jun-yaku K.K., Average particle diameter = 3 μm
(*6) Made by Wako Jun-yaku K.K., Average particle diameter = 3 μm
(*7) Primary particle diameter = 0.04 μm, Surface treated with stearic acid
(*8) Primary particle diameter = 1.5 μm, Surface not treated (E) Flat Cable - 1

EXAMPLES 31 to 36

Flame retardant resin compositions shown in Tables 9 and 10 were mixed and extruded to cover up both faces of parallel conductors, which were formed of seven conductors arranged in parallel at intervals of 2.0 mm (each conductor being formed by stranding seven tinned annealed-copper wires of 0.127 mm in diameter) with a covering thickness of 0.30 mm by the use of an extrusion coating apparatus made by Mitsuba Seisakusho, 50 mm in diameter) at 160° C. The coated example was irradiated by 200 kGy of electron beam at an accelerating voltage of 2 MeV to provide a flat cable. Examples 33 and 36 in Table 9 and Comparative Example 19 in Table 10 were not subjected to the process of electron beam irradiation.

The flame retardance of the thus obtained flat cable was tested by the VW-1 test such that 10 specimens each of the flat cable examples were tested and the example was judged to have failed in the test when even one of the 10 specimens caused it to burn 60 seconds or more, burn the kraft paper, or burn the absorbent cotton.

Further, to evaluate the flat cables for their mechanical strength, a tensile test (pulling speed: 500 mm/min) was carried out. The tensile strength and elongation (gauge length: 20 mm) of three specimens of each example were measured and their average values were calculated.

Examples 31 to 33 in Table 9 are flat cables produced by using the resin compositions of Examples 2, 5, and 7 in Table 1 with acetate added thereto, respectively, and Examples 34 to 36 in Table 9 are flat cables produced by using resin compositions of Examples 9, 12, and 14 in Table 2 with calcium carbonate added thereto, respectively.

All of the specimens passed the VW-1 test and many of their burning times have been distributed within the range of 0 to 20 seconds to prove their excellence in flame retardance.

Further, the flat cables of Examples 32 and 35 with γ-methacryloxypropyltrimetoxisilane added thereto as a silane coupling agent have been found to be excellent not only in flame retardance but also in mechanical strength, i.e., they have attained higher values than those provided in the UL Standards, over 1.06 kg/mm² in tensile strength and over 100% in elongation.

COMPARATIVE EXAMPLES 17 to 19

Comparative Examples 17 to 19 in Table 10 are flat cables produced by using the resin compositions of Comparative Examples 2 and 4 in Table 3, respectively.

All of the flat cables passed the VW-1 test. However, many of the burning times were distributed within the range of 20 to 40 seconds, whereby these were found to be inferior in flame retardance to Examples 31 to 33 in Table 9 mixed with acetate and Examples 34 to 36 in Table 9 with calcium carbonate added thereto.

TABLE 9

| Flat Cable (Conductor 0.127 mm φ, stranded 7 wires; Insul. Layer 0.3 mm thick) | Example 31 | 32 | 33 | 34 | 35 | 36 |
|---|---|---|---|---|---|---|
| Ethylene-vinylacetate copolymer (*1) | | 100 | 100 | | 100 | 100 |
| Ethylene-vinylacetate copolymer (*2) | 100 | | | 100 | | |
| Magnesium hydroxide (*3) | 150 | 150 | 180 | 150 | 150 | 180 |
| Magnesium hydroxide (*4) | | | | | | |
| Magnesium acetate (*5) | 50 | 30 | | | | |
| Calcium acetate (*6) | | | 10 | | | |
| Calcium carbonate (*7) | | | | 50 | 30 | |
| Calcium carbonate (*8) | | | | | | 10 |
| γ-methacryloxypropyltrimetoxisilane | | 2 | | | 2 | |
| Electron beam exposure dose (kGy) | 200 | 200 | 0 | 200 | 200 | 0 |
| Longest burning time distribution (Number of specimens: 10) | | | | | | |
| 0 to under 20 sec. | 10/10 | 7/10 | 6/10 | 8/10 | 6/10 | 6/10 |
| 20 to under 40 sec. | 0/10 | 3/10 | 4/10 | 2/10 | 4/10 | 4/10 |
| 40 to under 60 sec. | 0/10 | 0/10 | 0/10 | 0/10 | 0/10 | 0/10 |
| 60 sec. or over | 0/10 | 0/10 | 0/10 | 0/10 | 0/10 | 0/10 |
| Flame retardance VW-1 test (UL Std.) | | | | | | |
| Judgment | Passed | Passed | Passed | Passed | Passed | Passed |
| Initial tensile strength (kg/mm²) | 0.80 | 1.25 | 0.40 | 0.65 | 1.23 | 0.50 |
| Initial elongation (%) | 243 | 210 | 700 | 260 | 165 | 450 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m²/g, Surface treated with stearic acid
(*4) Average particle diameter = 0.7 μm, BET specific surface area = 7 m²/g, Surface not treated
(*5) Made by Wako Jun-yaku K.K., Average particle diameter = 3 μm
(*6) Made by Wako Jun-yaku K.K., Average particle diameter = 3 μm
(*7) Primary particle diameter = 0.04 μm, Surface treated with stearic acid
(*8) Primary particle diameter = 1.5 μm, Surface not treated

TABLE 10

| Flat Cable (Conductor 0.127 mm φ, stranded 7 wires; Insul. Layer 0.3 mm thick) | Comparative Example 17 | 18 | 19 |
|---|---|---|---|
| Ethylene-vinylacetate copolymer (*1) | | | |
| Ethylene-vinylacetate copolymer (*2) | 100 | 100 | 100 |
| Magnesium hydroxide (*3) | 200 | | |
| Magnesium hydroxide (*4) | | 200 | 200 |
| γ-methacryloxypropyltrimetoxisilane | | 2 | 2 |
| Electron beam exposure dose (kGy) | 200 | 200 | 0 |
| Longest burning time distribution (Number of specimens: 10) | | | |
| 0 to under 20 sec. | 0/10 | 1/10 | 0/10 |
| 20 to under 40 sec. | 6/10 | 6/10 | 5/10 |
| 40 to under 60 sec. | 4/10 | 3/10 | 5/10 |
| 60 sec. or over | 0/10 | 0/10 | 0/10 |
| Flame retardance VW-1 test (UL Std.) | | | |
| Judgment | Passed | Passed | Passed |
| Initial tensile strength (kg/mm²) | 0.70 | 1.18 | 0.55 |
| Initial elongation (%) | 225 | 150 | 670 |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m²/g, Surface treated with stearic acid
(*4) Average particle diameter = 0.7 μm, BET specific surface area = 7 m²/g, Surface not treated (F) Flat Cable - 2

EXAMPLES 37 - 42

The flame retardant resin compositions shown in Tables 11 and 12 were mixed and extruded by use of a T-die extruder made by Mitsuba Seisakusho onto one surface of a biaxially stretched polyester film at 160° C. to a thickness of 0.30 mm to provide a laminated tape of polyester film. Two tapes were placed on both faces of parallel conductors, formed of seven conductors arranged in parallel at intervals of 2.0 mm (each conductor being a stranded wire of seven tinned annealed-copper wires of a diameter of 0.127 mm) such that the polyester film of the laminated tapes is outer side. Thus, the laminated tapes were processed by a heat laminator set at 160° C. to form an insulating layer, which was then irradiated with an electron beam of 200 kGy at an accelerating voltage of 2 MeV to provide a flat cable.

Examples 39 and 42 in Table 11 and Comparative Example 22 in Table 12 were not subjected to the process of electron beam irradiation.

The flame retardance of the thus obtained flat cable was tested by the VW-1 test such that 10 specimens each of the flat cable were tested and the flat cable was judged to have failed the test when even one of the 10 specimens caused it to burn 60 seconds or more, burn the kraft paper, or burn the absorbent cotton.

Examples 37 to 39 in Table 11 are flat cables produced by using the resin compositions of Examples 2, 5, and 7 in Table 1 to which acetate was added and which were respectively laminated with the polyester film, while Examples 40 to 42 are flat cables produced by using the resin compositions of Examples 9, 12, and 14 in Table 2 to which calcium carbonate was added and which were respectively laminated with the polyester film.

In the VW-1 test, all of the flat cables passed the test and the burning times have been in the range of under 20 seconds with a probability of over 50%, though the burning times have been slightly longer than those of the flat cables of Examples 31 to 36 shown in Table 9 because of the structure laminated with polyester films.

COMPARATIVE EXAMPLES 20 to 22

Comparative Examples 20 to 22 in Table 12 are flat cables produces by using the resin compositions of Comparative Examples 2 and 4 in Table 3 which were respectively and laminated with the polyester film. When subjected to the VW-1 test, all of them passed the test but more than 50% of them exhibited the burning time of over 20 seconds.

Although in Comparative Examples 20 to 22 in Table 12 the magnesium hydroxide content was more than that of Examples 37 to 39 or Examples 40 to 42 in Table 11, the flat cables were found to be unable to cease within 20 seconds at a probability of 50% or above in the VW-1 test and failed to satisfy the initial tensile strength and elongation specified in the UL Standards.

TABLE 11

| Flat Cable | Example | | | | | |
|---|---|---|---|---|---|---|
| (Conductor 0.127 mm φ, stranded 7 wires; Insul. Layer 0.3 mm thick) | 37 | 38 | 39 | 40 | 41 | 42 |
| Ethylene-vinylacetate copolymer (*1) | | 100 | 100 | | 100 | 100 |
| Ethylene-vinylacetate copolymer (*2) | 100 | | | 100 | | |
| Magnesium hydroxide (*3) | 150 | 150 | 180 | 150 | 150 | 180 |
| Magnesium hydroxide (*4) | | | | | | |
| Magnesium acetate (*5) | 50 | 30 | | | | |
| Calcium acetate (*6) | | | 10 | | | |
| Calcium carbonate (*7) | | | | 50 | 30 | |
| Calcium carbonate (*8) | | | | | | 10 |
| γ-methacryloxypropyltrimetoxisilane | | 2 | | | 2 | |
| Electron beam exposure dose (kGy) | 200 | 200 | 0 | 200 | 200 | 0 |
| Longest burning time distribution (Number of specimens: 10) | | | | | | |
| 0 to under 20 sec. | 6/10 | 6/10 | 5/10 | 5/10 | 6/10 | 5/10 |
| 20 to under 40 sec. | 4/10 | 4/10 | 5/10 | 5/10 | 4/10 | 5/10 |
| 40 to under 60 sec. | 0/10 | 0/10 | 0/10 | 0/10 | 0/10 | 0/10 |
| 60 sec. or over | 0/10 | 0/10 | 0/10 | 0/10 | 0/10 | 0/10 |
| Flame retardance VW-1 test (UL Std.) | | | | | | |
| Judgment | Passed | Passed | Passed | Passed | Passed | Passed |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m²/g, Surface treated with stearic acid
(*4) Average particle diameter = 0.7 μm, BET specific surface area = 7 m²/g, Surface not treated
(*5) Made by Wako Jun-yaku K.K., Average particle diameter = 3 μm
(*6) Made by Wako Jun-yaku K.K., Average particle diameter = 3 μm
(*7) Primary particle diameter = 0.04 μm, Surface treated with stearic acid
(*8) Primary particle diameter = 1.5 μm, Surface not treated

TABLE 12

| Flat Cable (Conductor 0.127 mm φ, stranded 7 wires; | Comparative Example | | |
|---|---|---|---|
| Insul. Layer 0.3 mm thick) | 20 | 21 | 22 |
| Ethylene-vinylacetate copolymer (*1) | | | |
| Ethylene-vinylacetate copolymer (*2) | 100 | 100 | 100 |
| Magnesium hydroxide (*3) | 200 | | |
| Magnesium hydroxide (*4) | | 200 | 200 |

TABLE 12-continued

| Flat Cable (Conductor 0.127 mm φ, stranded 7 wires; Insul. Layer 0.3 mm thick) | Comparative Example | | |
|---|---|---|---|
| | 20 | 21 | 22 |
| γ-methacryloxypropyltrimetoxisilane | | 2 | 2 |
| Electron beam exposure dose (kGy) | 200 | 200 | 0 |
| Longest burning time distribution (Number of specimens: 10) | | | |
| 0 to under 20 sec. | 0/10 | 1/10 | 0/10 |
| 20 to under 40 sec. | 2/10 | 3/10 | 4/10 |
| 40 to under 60 sec. | 8/10 | 7/10 | 6/10 |
| 60 sec. or over | 0/10 | 0/10 | 0/10 |
| Flame retardance VW-1 test (UL Std.) | | | |
| Judgment | Passed | Passed | Passed |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 m²/g, Surface treated with stearic acid
(*4) Average particle diameter = 0.7 μm, BET specific surface area = 7 m²/g, Surface not treated (G) DC High-voltage Electric Wire- 1

EXAMPLES 43 to 50

With a tinned annealed-copper wire of an outer diameter of 0.8 mm used as the conductor, a material obtained by adding 0.3 part by weight of pentaerythrityltetrakis [3-(3,5-t-butyl-4hydroxyphenyl)propionate] to 100 parts by weight of high density polyethylene (density=0.954, melt flow rate =0.8:ASTM D1238) was formed into an insulating layer over the conductor by the use of a melt extruder (full flight type, 45 mm in diameter, L/D=24, compression ratio=2.5).

To form a jacketing, pellets shown in Tables 13 and 14 were melt-extruded over the insulating layer by the use of a melt extruder (full flight type, 45 mm in diameter, L/D=24, compression ratio=2.5) so that the outer diameter would become 4.2 mm and, thereafter, 150 kGy of electron beam was applied at an accelerating velocity of 5 MeV onto the obtained article to provide a high voltage DC electric wire.

A high-voltage cut-through test was carried out on the obtained high-voltage DC electric wire by applying a DC voltage of 60 kV to the wire under a load of one pound each applied to both ends of the wire specimen in a Geer oven at 125° C. with n=3.

A withstand voltage test (Method II) was carried out, after having electric wire specimens heat-aged in a Geer oven at 158° C. for seven days, by winding the wire specimen seven turns around a mandrel, 0.5 inches in outer diameter, and then applying a DC voltage of 50 kV to the wire specimen in a Geer oven at 125° C. with n=3. Under the heading of "High-voltage Cut-through Test" and "Withstand Voltage Test," Tables 13 and 14 show the times taken for the first one to breakdown in each three specimens.

A heat aging test was carried out by evaluating residual elongation rates (%) of electric wire specimens after being heat-aged in a Geer oven at 158° C. for seven days.

Here, residual elongation rate (%)=(elongation of heat-aged specimen/initial elongation)×100 and a residual elongation rate of 65% or more was judged to have passed. VW-1 test was carried out with n=10.

Examples 43 to 50 in Table 13 are high-voltage DC electric wire using, as the jacketing, the resin compositions in which 100 parts by weight of ethylene-vinylacetate copolymer resin were compounded with 150 to 190 parts by weight of magnesium hydroxide as metal hydroxide and 10 to 50 parts by weight of magnesium acetate or calcium acetate as acetate or 10 to 40 parts by weight of calcium carbonate.

All of the specimens passed the VW-1 test. Further, they have exhibited a mechanical strength to exceed the values provided in the UL Standards, over 1.06 kg/mm² in initial tensile strength and over 100% in initial elongation. They have also proved to pass the test for physical property after heat aging, the high-voltage cut-through test, and the withstand voltage test.

COMPARATIVE EXAMPLES 23 and 24

Comparative Examples 23 and 24 shown in Table 14 are high-voltage DC electric wire using, as the jacketing, the resin composition in which 100 parts by weight of ethylene-vinylacetate copolymer resin were compounded with 200 parts by weight of magnesium hydroxide as metal hydroxide.

While the resin compositions of Comparative Examples 23 and 24 in Table 14 passed the tests for the initial mechanical property and the residual elongation rate after heat aging, the high-voltage cut-through test, and the withstand voltage test, the high-voltage DC electric wire using such material, though its magnesium hydroxide content was more than that in Examples 43 to 50 in Table 13, failed the VW-1 test.

TABLE 13

| DC High-voltage Electric Wire (conductor 0.8 mm φ, Insul. Layer 0.4 mm thick, Outside diameter of outer sheath 4.2 mm φ) | Example | | | | | | | |
|---|---|---|---|---|---|---|---|---|
| | 43 | 44 | 45 | 46 | 47 | 48 | 49 | 50 |
| Ethylene-vinylacetate copolymer (*1) | 100 | | 100 | | 100 | | 100 | |
| Ethylene-vinylacetate copolymer (*2) | | 100 | | 100 | | 100 | | 100 |
| Magnesium hydroxide (*3) | | | | | | | | |
| Magnesium hydroxide (*4) | 190 | 160 | 160 | 150 | 190 | 160 | 190 | 160 |
| Magnesium acetate (*5) | 10 | 40 | | | | | | |
| Calcium acetate (*6) | | | 20 | 50 | | | | |
| Calcium carbonate (*7) | | | | | 10 | 40 | | |
| Calcium carbonate (*8) | | | | | | | 10 | 40 |
| γ-methacryloxypropyltrimetoxisilane | 1 | 2 | 1 | 2 | 1 | 2 | 1 | 2 |
| Electron beam exposure dose (kGy) | 150 | 150 | 150 | 150 | 150 | 150 | 150 | 150 |
| Initial Tensile Strength (kg/mm²)/Elongation (%) | 1.23/160 | 1.26/158 | 1.22/160 | 1.25/160 | 1.32/175 | 1.28/168 | 1.14/162 | 1.33/165 |

TABLE 13-continued

| DC High-voltage Electric Wire (conductor 0.8 mm φ, Insul. Layer 0.4 mm thick, Outside diameter of outer sheath 4.2 mm φ) | Example | | | | | | | |
|---|---|---|---|---|---|---|---|---|
| | 43 | 44 | 45 | 46 | 47 | 48 | 49 | 50 |
| Residual elongation rate (%) after 7-day aging at 158° C. | 90 | 85 | 93 | 88 | 95 | 83 | 94 | 89 |
| High-voltage cut-through holding time (Hr) | >8 | >8 | >8 | >8 | >8 | >8 | >8 | >8 |
| Withstand voltage test holding time (Hr) | >8 | >8 | >8 | >8 | >8 | >8 | >8 | >8 |
| Flame retardance (VW-1 test (UL std.) | 10/10 Passed | 10/10 Passed | 10/10 Passed | 10/10 Passed | 10/10 Passed | 10/10 Passed | 10/10 Passed | 10/10 Passed |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 $m^2/g$, Surface treated with stearic acid
(*4) Average particle diameter = 0.7 μm, BET specific surface area = 7 $m^2/g$, Surface not treated
(*5) Made by Wako Jun-yaku K.K., Average particle diameter = 3 μm
(*6) Made by Wako Jun-yaku K.K., Average particle diameter = 3 μm
(*7) Primary particle diameter = 0.04 μm, Surface treated with stearic acid
(*8) Primary particle diameter = 1.5 μm, Surface not treated

TABLE 14

| DC High-volt Electric Wire (conductor 0.8 mm φ, Insul. Layer 0.4 mm thick, Outside diameter of outer sheath 4.2 mm φ) | Comparative Example | |
|---|---|---|
| | 23 | 24 |
| Ethylene-vinylacetate copolymer (*1) | 100 | |
| Ethylene-vinylacetate copolymer (*2) | | 100 |
| Magnesium hydroxide (*3) | | |
| Magnesium hydroxide (*4) | 200 | 200 |
| γ-methacryloxypropyltrimetoxisilane | 1 | 2 |
| Electron beam exposure dose (kGy) | 150 | 150 |
| Initial Tensile Strength ($kg/mm^2$)/Elongation (%) | 1.38/140 | 1.45/132 |
| Residual elongation rate (%) after 7-day aging at 158° C. | 78 | 70 |
| High-voltage cut-through holding time (Hr) | >8 | >8 |
| Withstand voltage test holding time (Hr) | >8 | >8 |
| Flame retardance (VW-1 test (UL std.) | 8/10 Not Passed | 7/10 Not Passed |

Notes:
(*1) Vinyl acetate content = 25%, Melt flow rate = 3
(*2) Vinyl acetate content = 45%, Melt flow rate = 1
(*3) Average particle diameter = 0.7 μm, BET specific surface area = 7 $m^2/g$, Surface treated with stearic acid
(*4) Average particle diameter = 0.7 μm, BET specific surface area = 7 $m^2/g$, Surface not treated According to the invention, as described above, insulated wires, tubes, heat-shrinkable tubes, flat cables, and high voltage DC electric wire which are free from the problem of generating harmful gas when burned, having high mechanical strength and excellent flame retardance can be obtained. These products can be used for wiring in electronic computers, OA equipment, consumer electronic appliances such as audio and video apparatuses, vehicles, marine vessels, and so on.

What is claimed is:

1. A flame retardant resin composition compounded of thermoplastic resin, metal hydroxide, and acetate comprising:
   100 to 250 parts by weight of the metal hydroxide; and
   5 to 50 parts by weight of the acetate based upon 100 parts by weight of the thermoplastic resin.

2. A flame retardant resin composition according to claim 1 wherein the thermoplastic resin is at least one ethylene-α-olefin copolymer selected from the group consisting of ethylene-vinyl acetate copolymer, ethylene-ethyl acrylate copolymer, ethylene-methyl methacrylate copolymer, ethylene-methacrylic acid copolymer, and ethylene-methyl acrylate copolymer.

3. A flame retardant resin composition according to claim 2, wherein the ethylene-α-olefin copolymer is an ethylene-vinylacetate copolymer containing 6 to 50% by weight of vinyl acetate component and having a melt flow rate of 0.5 to 30 measured at 190° C. and under a load of 2.16 kg.

4. A flame retardant resin composition according to claim 1, further comprising an organosilicon compound coupling agent expressed by the formula (1):

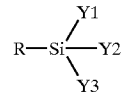

where R denotes alkyl including acryl, methacryl, or allyl and Y1, Y2, and Y3 denote an atomic group selected from the group consisting of alkyl, alkoxyl, and halogen, in the amount of 0.1 to 10 parts by weight based on 100 parts by weight based on 100 parts by weight of the thermoplastic resin.

5. The flame retardant resin composition according to claim 1, wherein the acetate has a particle diameter of 0.5 to 5 μm and is at least one member selected from the group consisting of magnesium acetate, sodium acetate, potassium acetate, zinc acetate, copper acetate, ferrous acetate, calcium acetate, aluminum acetate, nickel acetate, cobalt acetate, gallium acetate, silver acetate, tin acetate, barium acetate, cerium acetate, lead acetate, and beryllium acetate.

6. An insulated wire provided with an insulation layer made of a flame retardant resin composition compounded of thermoplastic resin, metal hydroxide, and acetate, comprising:
   100 to 250 parts by weight of the metal hydroxide; and
   5 to 50 parts by weight of the acetate, based upon 100 parts by weight of the thermoplastic resin.

7. An insulated wire according to claim 6, wherein the insulation layer is cross-linked.

8. A thin-wall high-strength insulated wire comprising a conductor, having an outer diameter of up to 1.0, and an insulation layer covering said conductor, said insulation being a flame retardant resin composition compounded of thermoplastic resin, metal hydroxide, and acetate, comprising:
   100 to 250 parts by weight of the metal hydroxide; and 5 to 50 parts by weight of the acetate, based upon 100 parts by weight of the thermoplastic resin and having a thickness of 0.1 mm to 1.0 mm and wherein said insulation layer is cross-linked.

9. An insulating tube made of a flame retardant resin composition compounded of thermoplastic resin, metal hydroxide, and acetate, comprising: 100 to 250 parts by weight of the metal hydroxide; and 5 to 50 parts by weight of the acetate, based upon 100 parts by weight of the thermoplastic resin.

10. An insulating tube according to claim 9, wherein said tube is cross-linked.

11. A heat shrinkable tube obtained, after a tube-formed product made of a flame retardant resin composition compounded of thermoplastic resin, metal hydroxide, and acetate, comprising: 100 to 250 parts by weight of the metal hydroxide; and 5 to 50 parts by weight of the acetate, based upon 100 parts by weight of the thermoplastic resin has been crosslinked, by expanding the tube-formed product in its radial direction under a heated condition and, thereupon, cooling the tube to maintain its expanded form.

12. A flat cable with a parallel arrangement of a plurality of conductors spaced-apart and enclosed in an insulation layer, said insulation layer being made of a flame retardant resin composition compounded of thermoplastic resin, metal hydroxide, and acetate, comprising:

100 to 250 parts by weight of the metal hydroxide; and
5 to 50 parts by weight of the acetate, based upon 100 parts by weight of the thermoplastic resin.

13. A flat cable according to claim 12, wherein said insulation layer is cross-linked.

14. A flat cable according to claim 12, wherein at least one face of said insulation layer is laminated with a film made of polymeric material.

15. A flat cable according to claim 13, wherein at least one face of said insulation layer is laminated with a film made of polymeric material.

16. A flat cable according to claim 12, wherein said insulation layer is irradiated with ionizing radiation.

17. A high-voltage DC electric wire according to claim 16, wherein said insulating layer and said jacketing are cross-linked.

18. A high-voltage DC electric wire provided with a coating of an ethylene-α-olefin copolymer resin composition as an insulation layer covering the conductor and provided with a jacketing made of a flame retardant resin composition compounded of thermoplastic resin, metal hydroxide, and acetate, comprising:

100 to 250 parts by weight of the metal hydroxide; and
5 to 50 parts by weight of the acetate, based upon 100 parts by weight of the thermoplastic resin over said insulation layer.

* * * * *

UNITED STATES PATENT AND TRADEMARK OFFICE
CERTIFICATE OF CORRECTION

PATENT NO.   : 6,436,557 B1
DATED         : August 20, 2002
INVENTOR(S)  : Kiyoaki Moriuchi et al.

It is certified that error appears in the above-identified patent and that said Letters Patent is hereby corrected as shown below:

<u>Column 32,</u>
Line 61, after "1.0" insert -- mm --.

Signed and Sealed this

Thirty-first Day of December, 2002

JAMES E. ROGAN
*Director of the United States Patent and Trademark Office*